United States Patent [19]

Stiles et al.

[11] 4,082,990
[45] Apr. 4, 1978

[54] ELECTROSTATIC PICKOFF AND TORQUER

[75] Inventors: John Callender Stiles, Morris Plains; Lincoln Stark Ferriss, Lincoln Park, both of N.J.

[73] Assignee: The Singer Company, Little Falls, N.J.

[21] Appl. No.: 727,888

[22] Filed: Sep. 29, 1976

[51] Int. Cl.² .............................................. G05B 1/06
[52] U.S. Cl. .................................... 318/662; 340/200; 324/61 R
[58] Field of Search ............... 318/662; 361/280, 292, 361/278, 300; 324/61 R, 61 P; 340/200

[56] References Cited
U.S. PATENT DOCUMENTS

| | | | |
|---|---|---|---|
| 3,515,987 | 6/1970 | Zurbrick et al. | 324/61 R |
| 3,843,924 | 10/1974 | Wahlgren | 324/61 R |
| 3,873,916 | 3/1975 | Sterki | 324/61 R |
| 3,961,318 | 6/1976 | Farrand et al. | 324/61 R X |

Primary Examiner—Robert K. Schaefer
Assistant Examiner—John J. Feldhaus
Attorney, Agent, or Firm—L. A. Wright; T. W. Kennedy

[57] ABSTRACT

An instrument which performs with precision either as a pickoff or torquer and which is not subject to geometrical errors due to the electrodes going out of round. The pickoff electrodes of the instrument are mounted adjacent the end of the movable element instead of being concentric to it. Because of the location of the pickoff electrodes relative to the movable element, the device is a variable area pickoff rather than a variable gap pickoff. This provides the advantages of obtaining outputs from the X and Y axes which are a linear function of the motion of the movable element and, therefore, the displacement angle, as determined by the ratio of X and Y outputs, is independent of the amplitude of motion.

11 Claims, 7 Drawing Figures

PRIOR ART $$L_1{}^2 (L_2+L_3) = \tfrac{1}{3}(L_2{}^3+L_3{}^3)$$

ELECTROSTATIC PICKOFF AND TORQUER

This invention relates to an electrostatic pickoff and/or torquer. More particularly, this invention relates to an electrostatic variable area pickoff and/or torquer.

BACKGROUND OF THE INVENTION

In certain instruments, such as gyroscopes, there is a sensitive movable element (e.g., the gyro rotor) capable of small motions about its central position within the instrument housing. In these instruments, it is necessary to apply a force or torque to the sensitive element to force the element back to its central position. The manner in which the sensitive element is forced back to its central position is usually accomplished by applying a voltage to electrode plate pairs. The electrode plate pairs are separated by a narrow gap from the sensitive element along the X and Y axes. The plate electrodes parallel to the X and Y axes and the sensitive element form pairs of capacitors along these axes. When the sensitive element moves from its central position, a voltage is induced across the load resistor of the capacitive circuit in either the X or Y axis or both. This output signal is used by appropriate circuitry to cause the element to be forced back to its central position. Thus, the same X and Y axis capacitive circuits may be used as a pickoff or as a torquer.

A disadvantage of the instrument described is that there are independent X and Y axis pickoffs, each having its own scale factor determined by the electrode plate area and the nominal gap between the plate and the sensitive element. Another disadvantage is that there are instabilities in geometry; that is, if the electrode structure goes out of round, the average gap on the X-axis will differ from the Y-axis again changing the relative scale factors. Thus, the device will be unable to meet the scale factor requirement that the two pickoffs must be accurate to five parts per million in order to measure a displacement angle within an accuracy of one second of arc.

BRIEF DESCRIPTION OF THE INVENTION

The present invention provides an instrument which can perform either as a pickoff or torquer with high precision and which is not subject to geometrical error due to the electrodes going out of round. In the present invention, the pickoff electrodes are mounted adjacent the end of the movable element instead of being concentric to it. Also, the movable element has raised electrodes. The electrical connections between the pickoff and moving element form a capacitive circuit with load resistors which are similar to prior art connections. However, the instrument of the present invention is a variable area pickoff rather than a variable gap pickoff. This has two immediate advantages. First, the output of each axis is a linear function of the motion of the sensitive element and therefore the displacement angle determined by the ratio X and Y outputs is independent of the amplitude of motion. The second advantage is that X and Y outputs are free of geometrical distortion.

Accordingly, it is an object of this invention to provide an instrument usable as a pickoff or torquer which is not subject to geometrical errors.

Another object of this invention is to provide an instrument which is capable of measuring the direction of displacement and the direction of torque with high accuracy.

It is another object of this invention to provide an instrument in which staggered electrodes are employed to substantially eliminate errors due to geometrical distortion of the instrument.

These and other objects and advantages of the invention will be more readily understood by those skilled in the art after a detailed consideration of the following specification taken in conjunction with the accompanying drawings wherein.

Figure 1:
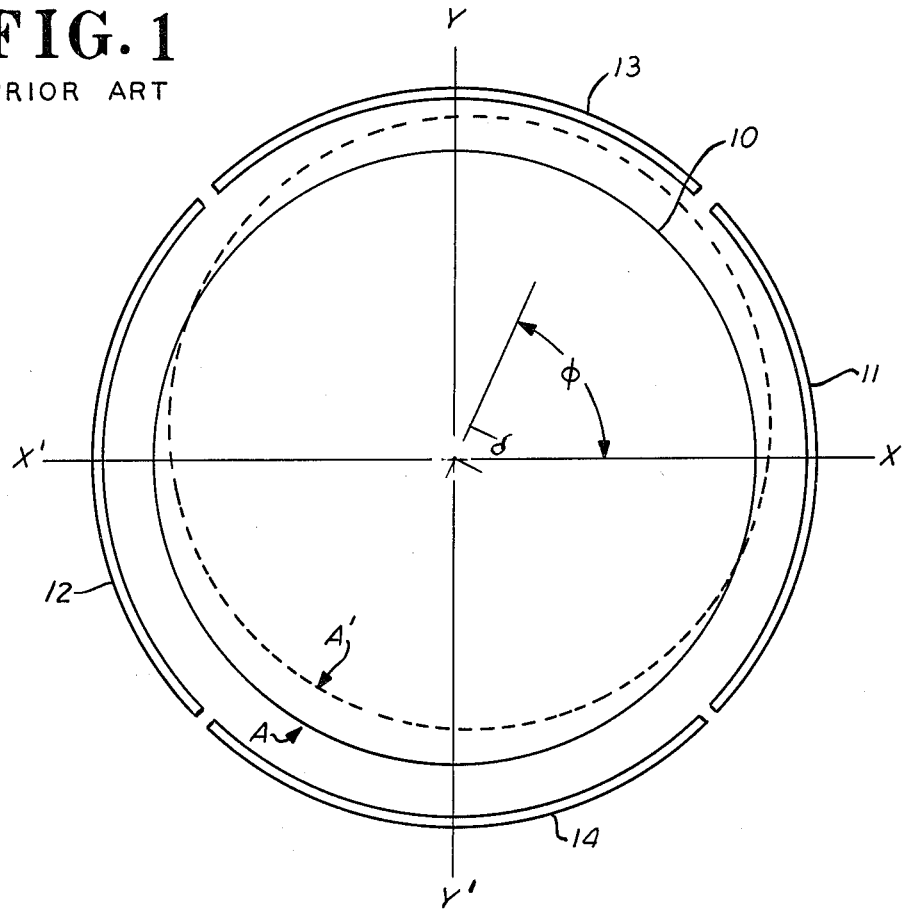
FIG. 1 shows a cross sectional view of a prior art movable element having concentric pickoff and/or torquer electrodes.
Figure 2:
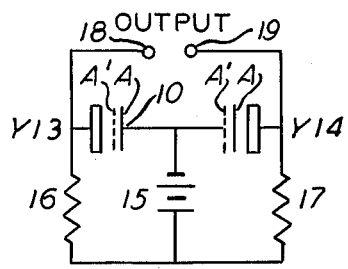
FIG. 2 is a circuit representation of the prior art device of FIG. 1.
Figure 3A:
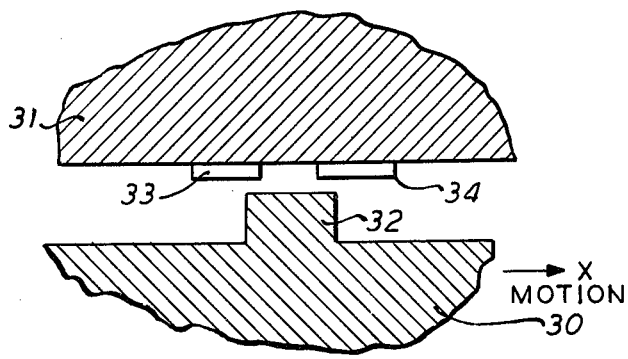
FIG. 3a shows a fragmentary cross sectional view of the instrument electrodes.
Figure 3B:
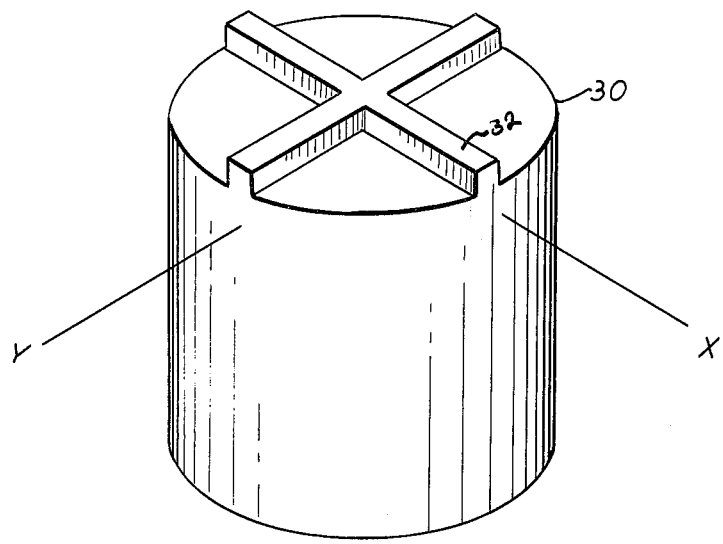
FIG. 3b shows a perspective view of the movable element having raised electrodes.

Referring to FIGS. 1 and 2, there is shown a typical prior art pickoff. FIG. 1 is a cross section of a device such as a gyro rotor 10 which is generally cylindrical in shape. Circle A represents the movable element in its central position. Circle A' shows the movable element displaced a distance $\delta$ in a direction $\phi$ in respect to the X-axis. It is required to measure the angle $\phi$ with an accuracy of approximately one second of arc and to apply a force in the direction of $\phi$ to return the movable element to its central position. To accomplish this, the case is equipped with fixed electrodes 11 and 12 on the X-axis and 13 and 14 on the Y-axis.

Each axis may be connected in a circuit as shown in FIG. 2. In FIG. 2, plates 13 and 14 along the Y-axis together with the movable element 10 form a pair of capacitors. These capacitors are charged with voltage V from source 15. When the movable element moves to a position A', the capacitance of 13 goes up and 14 goes down. This causes a current flow in resistors 16 and 17 with a resulting voltage drop which is the desired output signal. The same circuit is used for the X-axis pickoff and the ratio of the voltages is equal to the tangent of the displacement angle $\phi$. Thus, we have independent X and Y axis pickoffs, each with its own scale factor determined by the plate area and the nominal gap. The scale factor of these two pickoffs must be accurate to five parts per million in order to measure $\phi$ with an accuracy of one arc second. Instabilities in the geometry of the electrode structure make this very difficult. For instance, if the electrode structure goes out of round (e.g. because of thermal gradients or creep) the average gap on the X-axis will differ from the Y-axis thus changing the relative scale factors. If the nominal gap is 0.005 inch, the allowable out of roundness will be five parts per million of this or 0.000000025 inch. Stability of this order is probably beyond the limits of current technology. It can be shown that if the movable element is miscentered, a similar error occurs proportional to the square of the ratio of the eccentricity to the nominal gap. In addition to these and other geometrical errors, variable gap pickoffs of this type are non-linear. The gain varies with the amplitude and, therefore, the allowable range of motion can be only a very small fraction of the gap.

This type of pickoff can also be used as a torquer. In this case, the output terminals 18 and 19 shown in FIG. 2 become the input terminals for a control voltage. The resulting torque is proportional to the product of the control voltage and the bias voltage V. The gains of the X-torquer and the Y-torquer must be exactly matched and the same geometrical and amplitude errors apply to the torquer configuration.

Referring now to FIGS. 3 through 6, the pickoff and/or torquer of the present invention is shown. FIG. 3a shows a fragmentary cross sectional elevational view of the movable element 30 having raised electrode 32. The fixed plate 31 contains a pair of plate electrodes 33 and 34 overlaying electrode 32. FIG. 3b shows the movable element 30 in the configuration of a cylinder. As seen in FIG. 3a, the pickoff plate 31 is now mounted adjacent the end of movable element 30 instead of being concentric to it and movable element 30 is now equipped with raised electrodes 32.

Figure 4:
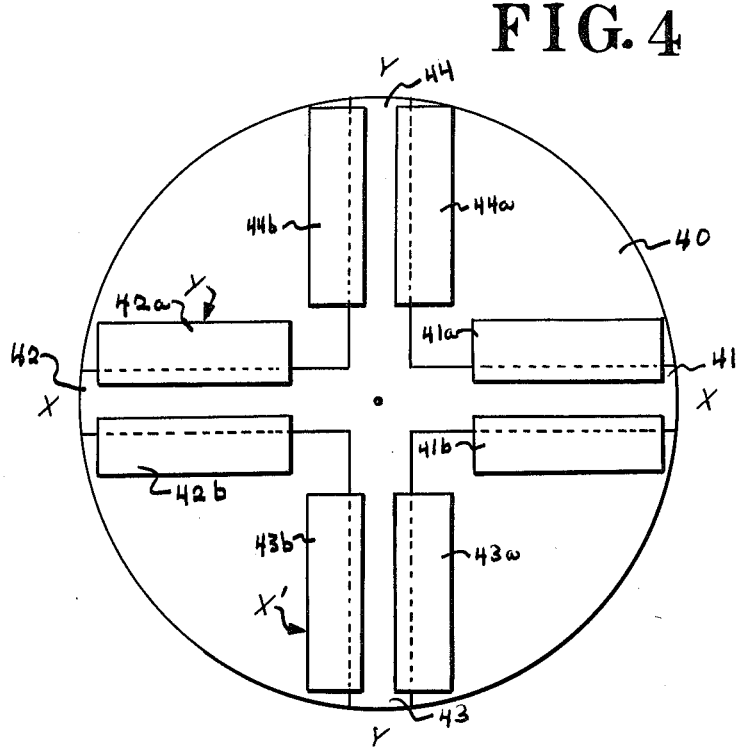
FIG. 4 shows a plan view of the invention.

Turning to FIG. 4, a plan view shows the relative positions of Y-axis electrodes 41 and 42 and X-axis electrodes 43 and 44 on moving element 40 and Y-axis plate electrodes 41a, 41b, 42a, 42b and X-axis plate electrodes 43a, 43b, 44a, 44b. The electrical connection for the electrodes on the moving element and fixed plates would be the same as shown in FIG. 2, but the device is now a variable area pickoff rather than a variable gap pickoff. This has two advantages. The first is that the output of each axis is a linear function of the motion of the sensitive element and therefore $\phi$, determined by the ratio of the X and Y axis outputs, is independent of the amplitude of the motion. Accordingly, the device is no longer restricted to small motions of sensitive element 40. The second advantage, more importantly, is that the X and Y axis gains are independent of geometric distortion. Both the moving and fixed elements can go out of round and become eccentric without affecting the relative scale factors.

Figure 5:
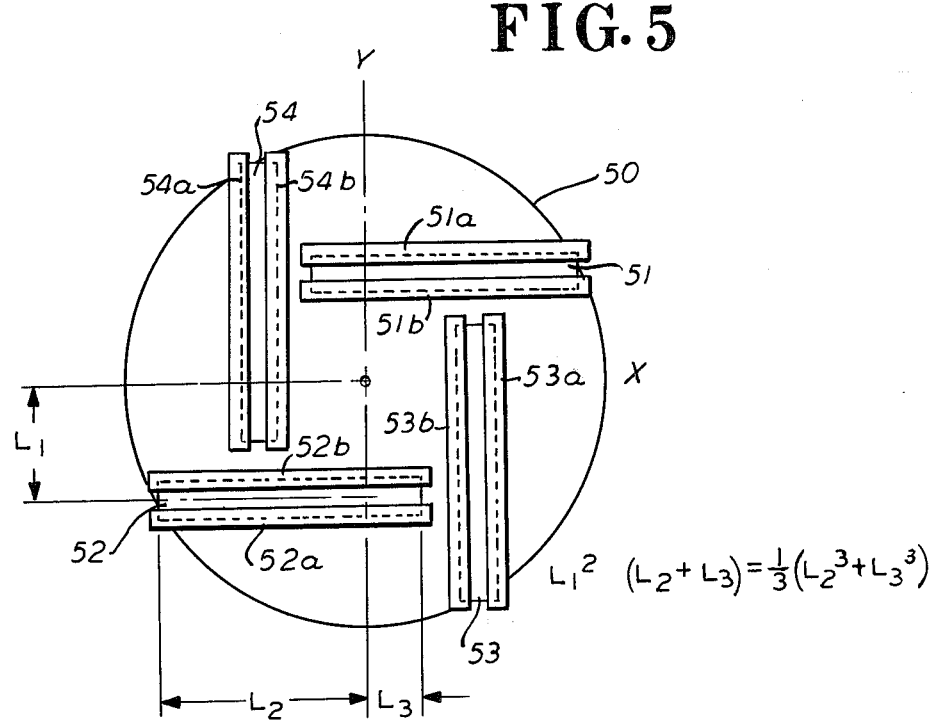
FIG. 5 shows a staggered or interleaved arrangement of electrodes and plates.
Figure 6:
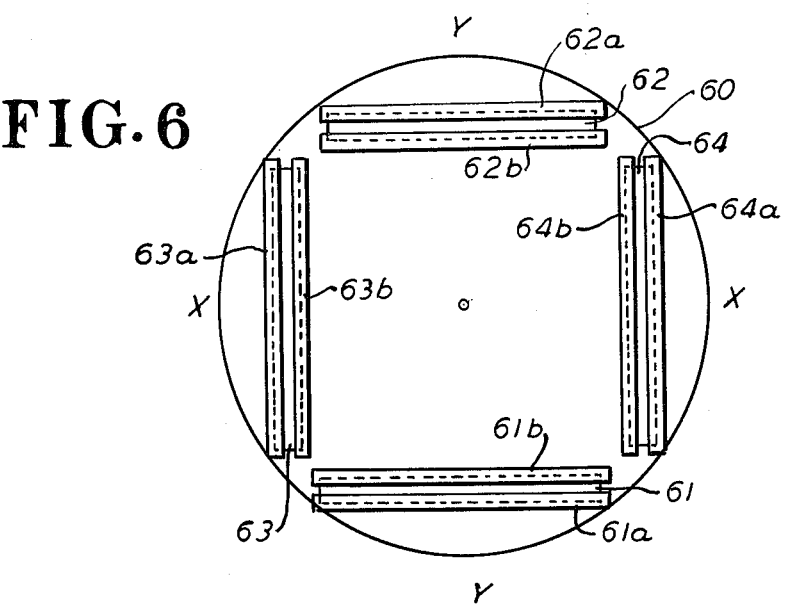
FIG. 6 shows an arc segment arrangement of plates and electrodes.

It is desirable to maximize the length of the plates in order to increase the scale factor. FIGS. 5 and 6 show alternate configurations that make better use of the available area. In FIG. 5, Y-axis electrodes 51 and 52 and X-axis electrodes 53 and 54 on moving element 50 are shown relative to Y-axis plate electrodes 51a, 51b, 52a, 52b and X-axis plate electrodes 53a, 53b, 54a, 54b.

In FIG. 6, the Y-axis electrodes are 61, 62, the X-axis electrodes are 63,64. The corresponding Y-axis plate electrodes are 61a, 61b, 62a, 62b and the corresponding X-axis plate electrodes are 63a, 63b, 64a, 64b and the moving element is 60. It is also possible to place additional electrodes in the available area; for instance, a second smaller square configuration could be added to the interior of the FIG. 6 design.

The design of FIG. 5 has some interesting aspects. Because of the way the X and Y axis electrodes are interleaved, the relative scale factors will be little affected by warping. If, for instance, the plane of the capacitor plate is bent along the X-axis, the gap for the X and Y axis plates are affected almost equally. Due to the fact that the scale factor is inversely proportional to the cube of the tilt angle, variations due to small angles are generally negligible. Nevertheless, the FIG. 5 design is configured so that for tilts about either the X or the Y axis, the nonlinearity effects are identical for both X and Y axis pickoffs and thus there is no change in the relative gain. The mathematical relationship between the various elements necessary for this to occur is:

$$L_1^2(L_2 + L_3) = \tfrac{1}{3}(L_2^3 + L_3^3),$$

as shown in FIG. 5.

There are many ways in which the above described pickoff and torquer can be fabricated. For example, the electrodes on the movable member may be machined into a metal ring. The fixed plate electrodes may be deposited on a sapphire substrate by well-known deposition techniques. In general, any fabrication technique will be satisfactory if it can maintain the position of the movable electrode center line in accordance with the equation in FIG. 5.

From the foregoing, an electrostatic pickoff and/or torquer has been described which has novel features of the use of identical structures for the pickoff and torquer and which has means to measure the direction of the displacement with high accuracy as opposed to the more common measure of the amount of displacement. Additional novel features of the invention are means to produce a torque with great angular precision and a staggered electrode design which substantially eliminate errors due to out of roundness, eccentricity, high amplitude, tilt and warpage of the component parts.

While a particular embodiment of the invention has been shown and described, modifications may be made, and it is intended in the following claims to cover the embodiments which fall within the true spirit and scope of the invention.

What is claimed is:

1. An electrostatic pickoff and torquer usable for sensing and controlling the position of the moving element of an instrument, comprising:
   a moving element capable of motion in any direction in the plane defined by orthogonal X and Y axes and movable simultaneously along both of said X and Y axis,
   a first pair of electrodes mounted on one end of said moving element parallel to said X axis,
   a second pair of electrodes mounted orthogonally to said first pair of electrodes on said end of said moving element parallel to said Y-axis,
   a plurality of fixed plate electrodes oriented parallel to the plane of said moving element and overlying said electrodes of said moving element in predetermined positions of motion of said moving element said fixed plate electrodes separated by a narrow gap from said moving element, and
   means for sensing changes in capacitance between said fixed plate electrodes and moving element because of a change in the area of said fixed plate electrodes overlying said moving element.

2. The apparatus of claim 1 comprising:
   a first pair of fixed plate electrodes oriented parallel to said X-axis, and
   a second pair of fixed plate electrodes oriented parallel to said Y-axis, said pairs of fixed plate electrodes being electrically isolated from each other.

3. The apparatus of claim 2 comprising:
   a first and second pair of fixed plate electrodes positioned parallel to said X-axis said first and second pair of fixed plate electrodes separated from each other at a point overlying the center of said moving element, and
   a third and fourth pair of fixed plate electrodes positioned parallel to said Y-axis, said third and fourth pairs of fixed plate electrodes separated from each other at said point overlying the center of said moving element whereby the central portion of said fixed plate electrode pairs forming an exposed area at said point overlying the center of said moving element.

4. The apparatus of claim 3 comprising:
a first pair of raised electrodes mounted on the end of said moving element parallel to said X-axis, and
a second pair of raised electrodes mounted on the end of said moving element parallel to said Y-axis.

5. The apparatus of claim 2 comprising:
a first electrode positioned parallel to said X-axis and situated in a first quadrant of said moving element,
a second electrode positioned parallel to said X-axis and situated in a third quadrant of said moving element base,
a third electrode positioned parallel to said Y-axis and situated in a second quadrant of said moving element base,
a fourth electrode positioned parallel to said Y-axis and situated in a fourth quadrant of said moving element, and
pairs of fixed plate electrodes overlying said moving element and matching the arrangement of the electrodes on said moving element.

6. The apparatus of claim 2 comprising:
first and second electrodes positioned on said moving element and arranged along opposite arc segments parallel to the X-axis of said moving element,
third and fourth electrodes positioned on said moving element and arranged along opposite arc segments parallel to the Y-axis,
pairs of matching fixed plate electrodes arranged to overlie each of said electrodes on said moving element, and
means for sensing capacitive changes between said fixed plate electrodes and said moving element.

7. An electrostatic pickoff comprising:
a movable element capable of displacement in a plane defined by orthogonal X and Y axes, said movable element simultaneously movable along both of said X and Y axes,
a first plurality of electrodes mounted on one end of said movable element parallel to said X-axis,
a second plurality of electrodes mounted on said end of said movable element parallel to said Y-axis, and
a plurality of fixed plate electrodes oriented parallel to said electrodes of said movable element in predetermined positions of displacement of said movable element and being separated by a narrow gap from said electrodes of said movable element, and means for sensing a change in capacitance between said fixed plate electrodes and said electrodes of said movable element because of a change in the area of said fixed plate electrodes overlying said electrodes of said movable element, whereby the output of each axis is a linear function of the motion of said movable element and the angle determined by the ratio of the X and Y outputs is independent of the amplitude of the motion of said moving element.

8. The electrostatic pickoff of claim 7 comprising:
a base, and
a plurality of fixed plate electrodes mounted on said base overlying said electrodes on said movable element.

9. The electrostatic pickoff of claim 8 comprising:
a source of voltage,
a plurality of resistors each of said plurality of fixed plate electrodes and said electrodes of said movable element connected in a circuit with said source of voltage and said resistors whereby a change in the capacitance between said fixed plate electrodes and said electrodes of said movable element develops an output signal across said resistors indicative of the movement of said movable element along said X and Y axes.

10. The electrostatic pickoff of claim 9 comprising:
means for introducing a control signal into said circuit whereby said movable element is forced back to its central position.

11. An electrostatic pickoff for sensing the position of a movable element comprising:
a movable element capable of displacement in a plane defined by orthogonal X and Y axes,
a first pair of electrodes mounted on one end of said movable element parallel to said X-axis,
a second pair of electrodes mounted on said end of said movable element parallel to said Y-axis,
a base,
a first pair of fixed plate electrodes mounted on said base parallel to said X-axis in overlying relation to said electrodes of said movable element,
a second pair of fixed plate electrodes mounted on said base parallel to said Y-axis in overlying relation to said electrodes of said movable element said first and second pairs of fixed plate electrodes separated from said electrodes of said movable element by a narrow gap,
a source of voltage, and
a plurality of resistances connected to said fixed plate electrodes, said fixed plate electrodes and said electrodes of said movable element connected to said source of voltage, whereby a change in capacitance between said fixed plate electrodes and said electrodes of said movable element due to a change in position of said movable element along said X and Y axes is sensed.

* * * * *